E. A. BUCKMAN.
ELECTRIC WELDER.
APPLICATION FILED SEPT. 19, 1914.

1,220,598.

Patented Mar. 27, 1917.
2 SHEETS—SHEET 1.

WITNESSES:

INVENTOR
Edward A. Buckman.

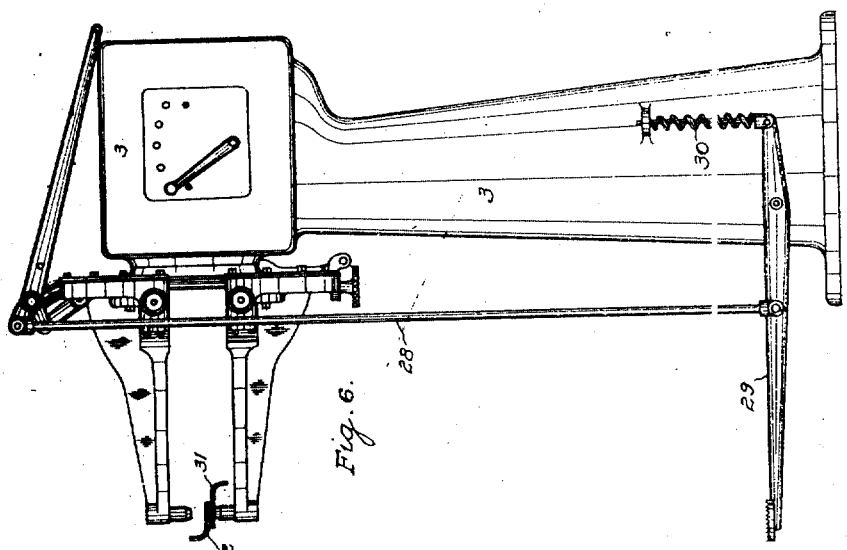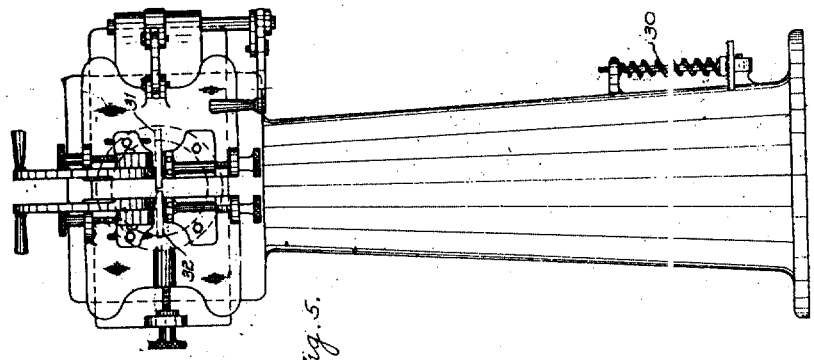

UNITED STATES PATENT OFFICE.

EDWARD A. BUCKMAN, OF WALKERVILLE, ONTARIO, CANADA, ASSIGNOR OF ONE-HALF TO ELIAS H. SELLERS.

ELECTRIC WELDER.

1,220,598.  Specification of Letters Patent.  Patented Mar. 27, 1917.

Application filed September 19, 1914. Serial No. 862,578.

*To all whom it may concern:*

Be it known that I, EDWARD A. BUCKMAN, a citizen of the United States, residing in Walkerville, in the county of Essex, Province of Ontario, in the Dominion of Canada, have invented certain new and useful Improvements in Electric Welding Apparatus, of which the following is a specification.

Figure 1:
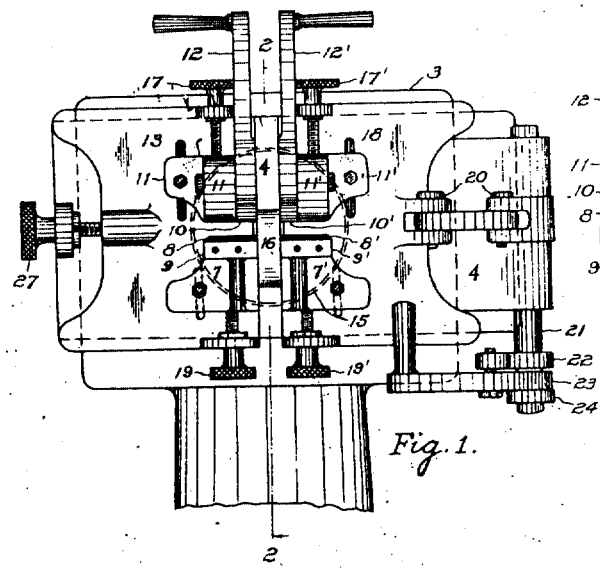
Figure 2:
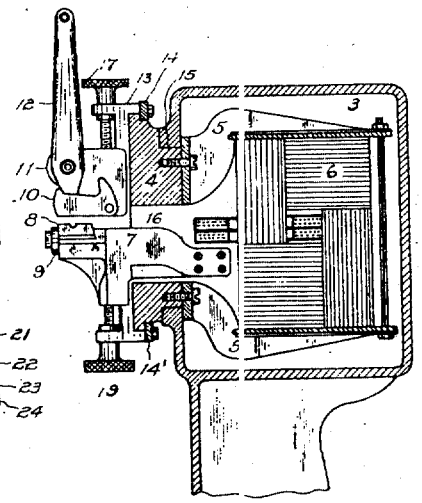
Figure 4:
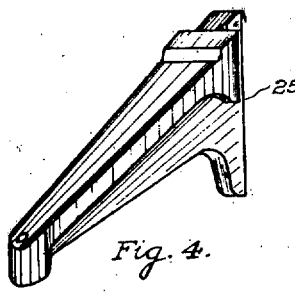
Figure 3:
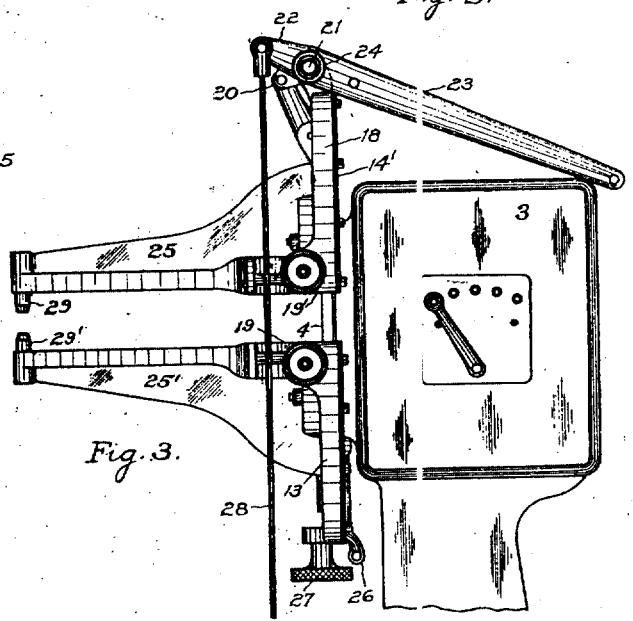

My invention relates to improvements in electric welding devices and more particularly to a combined butt and spot welding apparatus. One of the salient objects of my invention is to provide an electric welder structure which shall combine the mechanical features of a spot welder and a butt welder in one mechanical unit or mechanism, which is simple, efficient, and rapid in operation. A further object of my invention is to provide a vertically rotative welding head, or mechanism, which will permit the sliding or reciprocating movement of the electrodes to be changed from a horizontal to a vertical plane without disturbing the mechanical or electrical efficiency of the apparatus, and other and further objects of my invention will become apparent to those skilled in the art from the following description, taken in conjunction with the accompanying drawings in which:

Figure 1. is a front elevation, or view of the invention, showing the rotative welding mechanism in a horizontal position, as adapted to the purpose of butt welding metal bars or other metal objects. Fig. 2. is a cross section of Fig. 1. on the lines 2—2. showing the relative construction and action of the component parts of the invention. Fig. 3. is a side view of the invention as arranged or converted to spot welding purposes, the rotating head in a vertical position, and the detachable horns or arms in proper operative position. Fig. 4. is a perspective of one of the detachable horns or arms, which are prominent features of this invention. Fig. 5. is a view of a complete electric welding apparatus embodying the invention as operated in butt welding, and Fig. 6. shows the same apparatus, the rotative head in a vertical position, and converted to spot welding purposes by means of the foot pedal and connecting rod, and having the detachable horns gripped and held in operative position by the electrodes and clamping jaws of the butt welding mechanism.

Throughout the different views, like numerals of reference refer always to like parts.

In the drawings wherein my improvements are shown as embodied in a electric combined butt and spot welding apparatus, 3 indicates the casing or body of the apparatus, which contains the transformer 6; a circular opening 15 is provided in the front of this casing, through which a trunnion bearing, formed upon the head 4 is fitted and retained therein by the flange of the transformer support 5, which is rigidly attached to said trunnion as shown in Fig. 2; an axis is thereby provided, upon which the head 4 and support 5 may be rotated in a vertical plane, carrying with them the transformer and other members of the mechanism as a unit, rotatable in a vertical plane when desired.

Parallel ways are provided upon the head 4, whereon are mounted the reciprocating carriage member 18 and the adjustable carriage member 13, which are held in place upon the said ways by the gibs and 14'; the electrodes 7 and 7' are adjustably secured to the carriage members 18 and 13, and, by means of the adjusting screws 19 and 19' may be moved in a plane transverse to the movement of the carriage members, as may be seen in Fig. 1.

The electrodes are recessed at their outer ends to receive the dies 8 and 8' which are gripped by the die holders 9 and 9' respectively, the inner ends of the electrodes being suitably connected to the terminals of the transformer through the opening 16 in the head 4.

The clamp heads indicated at 11 and 11' are secured to the carriage members 13 and 18 above, and in alinement with, the dies 8 and 8' and by means of the adjusting screws 17 and 17' may be raised or lowered to permit objects of various size to be gripped and held in true and firm contact with the dies by means of the clamping jaws 10 and 10' which are actuated by the cam levers 12 and 12' respectively; referring to Fig. 2 it will be seen that if the lever 12 be moved forward, its lower end will engage the pawl upon the clamping jaw 10 and cause it to rise, while a reverse movement will force the jaw down to grip an object placed upon the die 8.

To operate the invention as a butt welder, the mechanism is rotated upon its axis until the head 4 assumes a horizontal position, as shown in Figs. 1 and 5; the objects to be welded are placed in proper position upon the copper dies 8 and 8' and gripped firmly by the steel clamping jaws 10 and 10' pressure being applied by the levers 12 and 12', the work so gripped being indicated at 31—32 in Fig. 5, and currents of electricity are admitted to the transformer 6 by a properly constructed switch, provided for this purpose; when the objects to be welded have become sufficiently heated, the weld is completed by forcing the parts together, pressure being applied by the lever 23 through the ram lever 22 and shaft 21 to the toggle action shown at 20, which moves the carriage member 18 and completes the weld.

The invention may be operated as a spot welder with very few changes, as shown in Fig. 6; the copper dies may be removed and the detachable spot welding-horns 25 and 25' inserted and clamped in operative position by the jaws 10 and 10', and the mechanism rotated until the head 4 assumes a vertical position, and is locked by the latch 26. The lever 23 may be disconnected and thrown back upon the casing 3 and a connecting rod 28 attached to the ram lever 22 and pivoted at its lower end to a foot pedal 29 equipped with a lifting spring 30, as in Fig. 6.

Objects of sheet metal to be welded may now be placed between the copper die points 29 and 29' as indicated at 31—32 Fig. 6.

Pressure and electricity may be applied by means of the foot pedal and switch as in butt welding.

While I have herein described in some detail an embodiment of my invention and the action thereof, which I have found to be practical and advantageous, it will be apparent to those skilled in the art that numerous changes in the specific construction might be made without departure from the spirit and scope of my invention.

Having thus described my invention, what I claim and desire to secure by Letters Patent, of the United States, is:

1. In an electric welding apparatus, a supporting member, a welding head journaled to rotate in said member and having welding electrodes movably mounted thereon, an electric transformer carried by said head to rotate therewith and electrically connected with said electrodes.

2. In an electric welding apparatus, a supporting case, a welding head journaled to rotate in said case, clamping jaws carrying welding electrodes movably mounted on said head, an electric transformer mounted on said head to rotate therewith and electrically connected with said electrodes.

3. In an electric welding apparatus, a supporting frame having a casing, a welding head journaled to rotate in said casing, a transformer mounted on said head and embraced by said casing, an adjustable carriage carrying clamping jaws and a welding electrode mounted on said head, a carriage carrying a welding electrode movably mounted on said head and movable toward and from said adjustable carriage, and electric conductors respectively connecting said transformer with said electrodes.

4. In an electric welding apparatus, a supporting member, a welding head journaled to rotate in said member and having electrodes movably mounted thereon, spot-welding arms detachably connected to said electrodes and movable therewith, an electric transformer carried by said head to rotate therewith and electrically connected with said electrodes.

In testimony whereof I hereunto set my hand in the presence of two witnesses.

EDWARD A. BUCKMAN.

Witnesses:
JOHN GRIMASON,
HATTIE GRIMASON.